Nov. 5, 1929.                M. ZUSMER                    1,734,844
                        FISH SALTING APPARATUS
                          Filed July 12, 1927
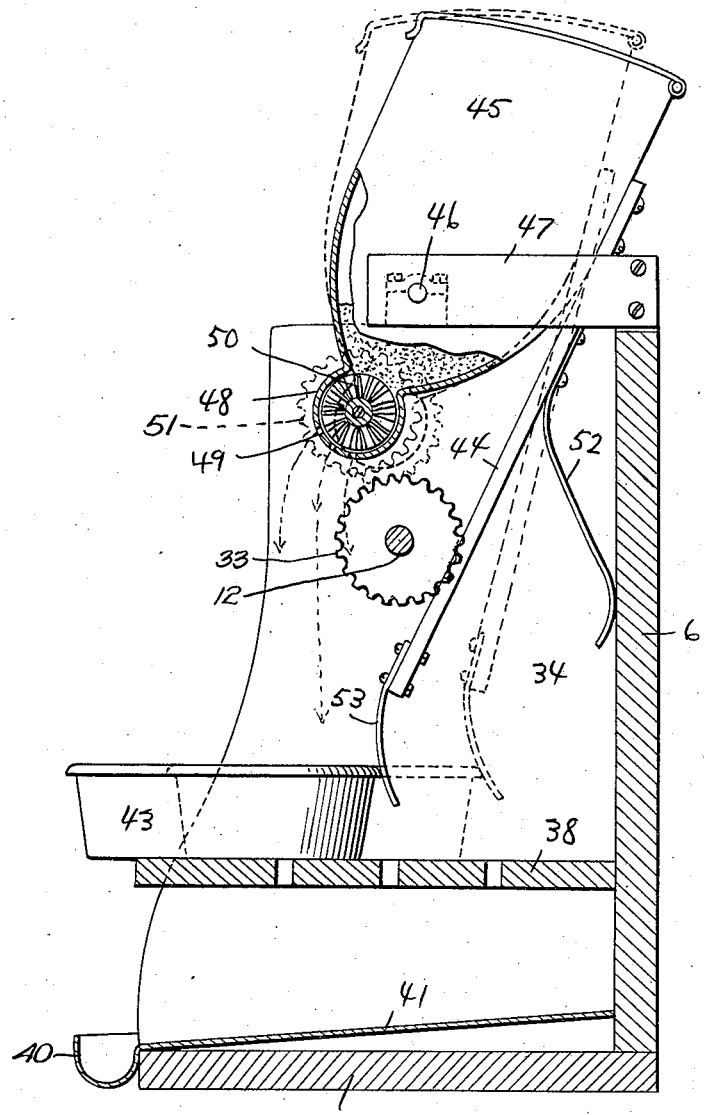
Inventor
Moses Zusmer
By Clarence A. O'Brien
                    Attorney Patented Nov. 5, 1929

1,734,844

UNITED STATES PATENT OFFICE

MOSES ZUSMER, OF BRONX, NEW YORK

FISH-SALTING APPARATUS

Application filed July 12, 1927. Serial No. 205,231.

The general object of my present invention is the provision of apparatus through the medium of which fish may be salted incident to the preparation of fish for packing.

Another important object of the invention lies in the provision of an apparatus of this nature which is simple in its construction, comparatively inexpensive to manufacture and operate, thoroughly reliable in its operation, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

The figure is a view, partly in vertical section and partly in elevation illustrative of the apparatus constituting the preferred embodiment of my invention.

Referring to the drawing in detail, it will be seen that the numeral 5 denotes a base with a back 6 rising therefrom and extending longitudinally thereof. A shaft 12 is appropriately supported in spaced relation in front of the said back 6. Any approved means may be employed to rotate the said shaft 12.

A horizontal partition 38 divides a compartment in front of the back wall 6 into an upper portion and a lower portion. A trough 40 is disposed along the edge of the base to take care of the waste matter the same having an inclined plate 41 leading thereto. A receptacle 43 is provided on the partition 38 to catch the segments of the fish as the fish is severed into different parts. A bar 44 is rigidly mounted on a receptacle 45, said receptacle being rockably mounted as at 46 in supporting members 47. The lower end of the receptacle is of a cylindrical formation as indicated at 48 and is apertured as indicated at 49 and has a rotatable agitating member 50 mounted therein operatively associated with which is a gear 51. A spring 52 is mounted on the bar 44 and engages the back 6 so as to normally hold the bar and the receptacle so that the gear 51 is out of mesh with the gear 33. Obviously, however, by pushing the bar 44 toward the back 6 these gears may be brought into mesh to start the operation of the agitator for salting the fish if desired. For convenience, a resilient member 53 is provided on the lower end of the bar 44 so that the pan 43 may be engaged therewith to rock the receptacle to bring the agitator thereof into operation.

It is thought that the construction, operation, and advantages of this invention will be quite apparent to those skilled in this art without a more detailed description thereof. The present embodiment of the invention, however, has been disclosed merely by way of example, since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. In an organized mechanism for the purpose described, a shaft, means for rotatably mounting the shaft, a gear on the shaft, a receptacle, means for rockably mounting the receptacle, an agitator in the receptacle, a gear operatively connected with the agitator, means for normally holding the receptacle so that the second gear is out of mesh with the first gear.

2. In an organized mechanism for the purpose described, a shaft, means for rotatably mounting the shaft, a gear on the shaft, a receptacle, means for rockably mounting the receptacle, an agitator in the receptacle, a gear operatively connected with the agitator, means for normally holding the receptacle so that the second gear is out of mesh with the first gear, a rod extending from the receptacle, so that the receptacle may be rocked to engage the first gear with the second gear.

3. In an organized mechanism for the purpose described, a shaft, means for rotatably mounting the shaft, a gear on the shaft, a receptacle, means for rockably mounting the receptacle, an agitator in the receptacle, a gear operatively connected with the agitator, means for normally holding the receptacle so that the second gear is out of mesh with the first gear, a rod extending from the receptacle, so that the receptacle may be rocked to engage the first gear with the second gear, a resilient extension on the bar.

4. In an organized mechanism for the purpose described, a shaft, means for rotatably mounting the shaft, a receptacle, means for rockably mounting the receptacle, the lower end of the receptacle being apertured, an agitator mounted in the lower end of the receptacle, a gear operatively connected with the agitator, a gear on the shaft, a bar extending from the receptacle whereby the receptacle may be rocked to place the first gear in mesh with the second gear.

5. In an organized mechanism for the purpose described, a shaft, means for rotatably mounting the shaft, a receptacle, means for rockably mounting the receptacle, the lower end of the receptacle being apertured, an agitator mounted in the lower end of the receptacle, a gear operatively connected with the agitator, a gear on the shaft, a bar extending from the receptacle whereby the receptacle may be rocked to place the first gear in mesh with the second gear, a shelf, said shelf adapted to receive a pan to catch fish after being cut, said bar having an extension so that the pan may be slid into engagement therewith for rocking the receptacle.

6. In an organized mechanism for the purpose described, a shaft, means for rotatably mounting the shaft, a receptacle, means for rockably mounting the receptacle, the lower end of the receptacle being apertured, an agitator mounted in the lower end of the receptacle, a gear operatively connected with the agitator, a gear on the shaft, a bar extending from the receptacle whereby the receptacle may be rocked to place the first gear in mesh with the second gear, a shelf, said shelf adapted to receive a pan to catch fish after being cut, said bar having an extension so that the pan may be slid into engagement therewith for rocking the receptacle, said extension being resilient.

In testimony whereof I affix my signature.

MOSES ZUSMER.